United States Patent [19]

Paoletti

[11] Patent Number: 4,715,274
[45] Date of Patent: Dec. 29, 1987

[54] EMULSIFIER UNIT PARTICULARLY FOR EMULSIFYING STEAM AND MILK TO PREPARE CAPPUCCINOS AND THE LIKE BEVERAGES

[75] Inventor: Luciano Paoletti, Florence, Italy

[73] Assignee: SPIDEM S.r.l., Pero Frazione Cerchiate, Italy

[21] Appl. No.: 824,853

[22] Filed: Jan. 31, 1986

[30] Foreign Application Priority Data

Jan. 31, 1985 [IT] Italy ................................ 19311 A/85
Sep. 6, 1985 [IT] Italy ............................. 22947/85[U]

[51] Int. Cl.$^4$ .............................................. B01F 3/00
[52] U.S. Cl. ...................................... 99/454; 99/275; 99/323.1; 99/452; 239/113; 239/427.3; 261/DIG. 7; 366/101; 366/139; 366/176; 366/341
[58] Field of Search ................. 99/323.1, 323.2, 323.3, 99/452, 453, 454, 483; 366/101, 176, 139; 222/1, 145; 239/113, 427.3, 427.5; 261/DIG. 7, 121 R; 426/474, 511, 409, 519, 522

[56] References Cited

U.S. PATENT DOCUMENTS

| | | | |
|---|---|---|---|
| 376,496 | 1/1888 | Von Roden | 99/323.2 |
| 1,406,380 | 2/1922 | Heath et al. | 99/453 X |
| 2,006,313 | 6/1935 | Geddes | 99/323.2 |
| 2,126,625 | 8/1938 | Eggleston | 99/454 X |
| 2,989,243 | 6/1961 | Turak | 239/113 |
| 3,326,472 | 6/1967 | Gjerde | 239/427.5 |
| 4,505,431 | 3/1985 | Huffman | 239/427.5 |
| 4,552,286 | 11/1985 | Kuckens et al. | 99/323.1 X |

Primary Examiner—Timothy F. Simone
Attorney, Agent, or Firm—Fleit, Jacobson, Cohn & Price

[57] ABSTRACT

An emulsifier unit particularly for emulsifying steam and milk to prepare "cappuccino's" comprises a steam delivery conduit in communication with a steam generator and opening into a suction chamber into which a milk delivery conduit is led, said suction chamber being in communication with an emulsifying chamber provided with an outward dispensing opening.

10 Claims, 10 Drawing Figures

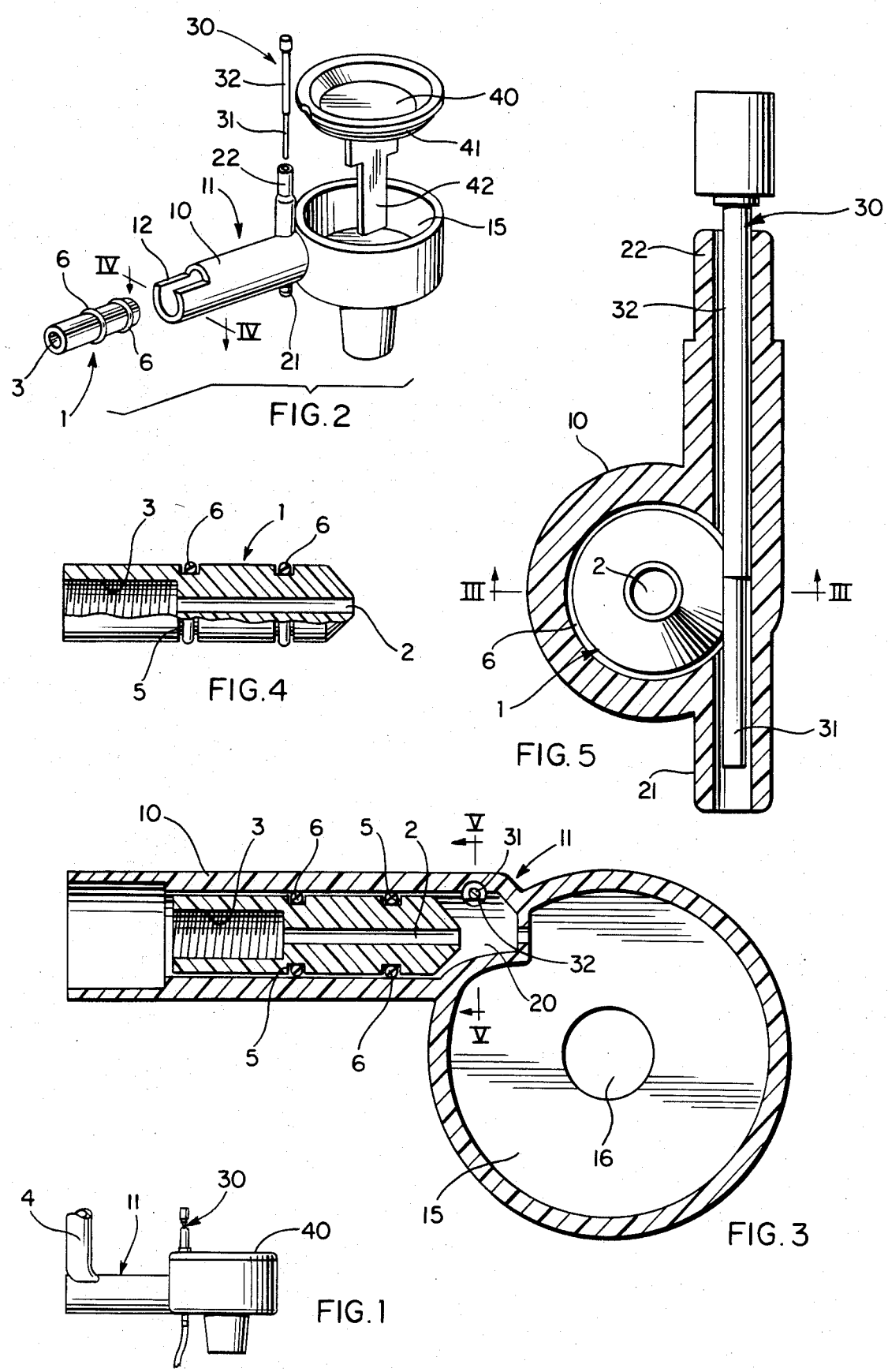

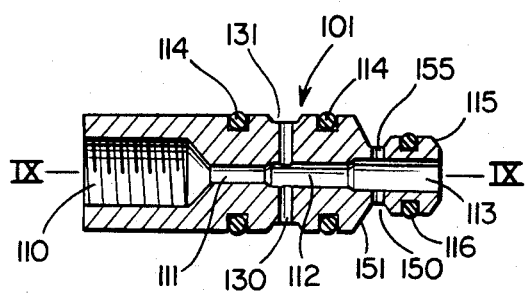
FIG. 8
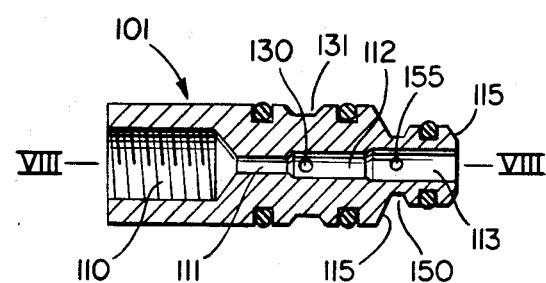
FIG. 9
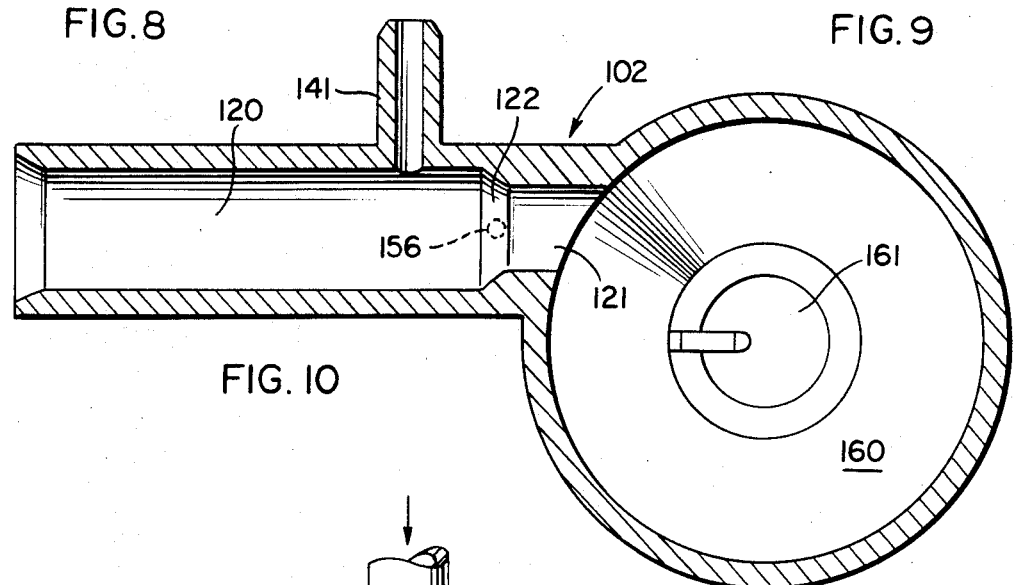
FIG. 10
FIG. 7
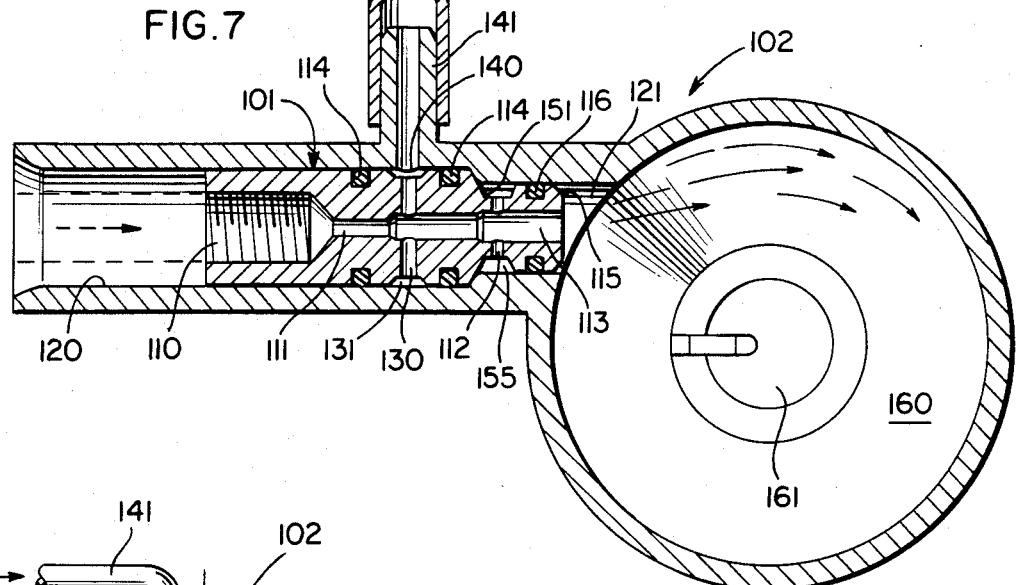
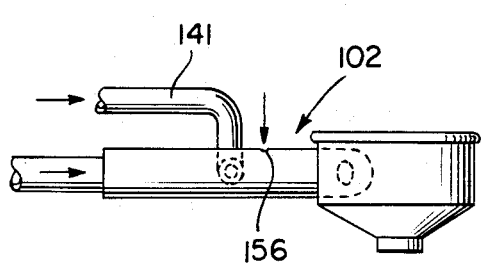
FIG. 6

EMULSIFIER UNIT PARTICULARLY FOR EMULSIFYING STEAM AND MILK TO PREPARE CAPPUCCINOS AND THE LIKE BEVERAGES

This invention relates to an emulsifier unit particularly for emulsifying steam and milk to prepare "cappuccino's" and the like beverages.

As is known, to emulsify milk for the preparation of cappuccino's, it is current practice to pour cold milk in a vessel which is then placed beneath the steam dispensing spout of a coffee making machine.

To complete the emulsive process and obtain the typical light cream of cappuccino, some skill is presently required of the operator, who is to perform movements directed to promote blending of air particles with the mass which create that light cream.

The task is made even more difficult where so-called household type coffee makers are used which have a reduced capability for steam dispensing, thereby the likelihood of obtaining a desired emulsion and amount of light cream is generally scarce.

It is the aim of this invention to solve the above-outlined problems by providing an emulsifier unit for preferred, but not exclusive, application to coffee making machines, which can bring about, in a near automatic fashion, a thorough and perfect emulsification of milk for cappuccino making.

That aim is achieved by an emulsifier unit of the type indicated, which is characterized in that it comprises a steam supply channel in communication with a steam generator and opening into a suction chamber whereto a milk suction conduit and an external air intake conduit are also led, said suction chamber being in communication with an emulsifying chamber having an outward dispensing opening.

Further features and advantages of the emulsifier unit of this invention will be apparent from the following description of an exemplary embodiment thereof, given by way of illustration and not of limitation with reference to the accompanying drawings, where:

FIG. 1 is an elevation view of an emulsifier unit according to the invention;

FIG. 2 is an exploded perspective view of the emulsifier unit of FIG. 1;

FIG. 3 is a sectional view of the emulsifier unit of FIG. 1, taken along the line III—III;

FIG. 4 is a section view of a detail of the emulsifier unit of FIG. 1;

FIG. 5 is a sectional view of the emulsifier unit of FIG. 1, taken along the line V—V;

FIG. 6 shows in elevation a modified embodiment of the inventive emulsifier unit;

FIG. 7 is a sectional view of the emulsifier unit of FIG. 6;

FIG. 8 is a sectional view of a detail of the emulsifier unit shown in FIG. 6, taken along the line VIII—VIII;

FIG. 9 is a sectional view of the detail of FIG. 8, taken along the line IX—IX; and FIG. 10 is a sectional view of another detail of the emulsifier unit of FIG. 6.

With reference to the drawing figures, an emulsifier unit particularly for emulsifying steam and milk to prepare cappuccino's and the like beverages, according to this invention, comprises a nozzle body, generally designated with the reference numeral 1, which defines on its interior a steam supply channel 2 adapted to be put in communication with a steam generator, not shown in the drawing.

More detailedly, at one end of the nozzle body 1, there is provided a threaded cavity 3 for threading to a steam delivery conduit 4 extending from the steam generator.

The nozzle body 1 has annular grooves 5 on its outer surface which accommodate annular seals 6 providing a seal inside a spigot 10 of a dispenser body 11. The spigot 10 also has, at its free end, an upper cutout 12 acting as an abutment and detent for correctly locating the nozzle body 1 within the spigot. The spigot 10 is connected to a cylindrical emulsifying chamber 15, tangentially thereto; the emulsifying chamber 15 is provided with an outward opening 16. At the spigot 10, on the emulsifying chamber 15 side, there is defined, in cooperation with the nozzle body 1, a suction chamber 20 whereto a milk intake conduit 21 and an air intake conduit 22 are led. The conduits 21 and 22 are expediently arranged juxtaposed to each other, and extend along a substantially perpendicular direction to the axial extent of the spigot.

In order to control as required the working cross-sectional areas of both the milk intake conduit 21 and air intake conduit 22, there is provided a shaped pin 30 which has a terminating tip 31 adapted to fit inside the channel 21 so as to restrict the working cross-sectional area for the milk flow accurately.

At the other end, the pin 30 has a facet formation 32 insertable into the external air intake conduit 22, and being effective to control the working cross-sectional area for the air flow.

With this arrangement, it becomes possible to provide the intake conduits, for both the air, 22, and the milk, 21, with relatively large cross-sectional areas, thereby they can be easily and quickly cleaned to prevent stagnation of any fat particles or the like, while affording adjustment of the working cross-sectional areas for the milk and air flows, as desired and according to necessity.

Furthermore, pins may be used to delimit different working cross-sectional areas for both the air and milk flows, or possibly pins arranged to change the working cross-sectiona flow areas by merely turning them.

The suction chamber 20 is in communication with the emulsifying chamber 15 which has the opening 16 at the bottom and is closeable at the top sealingly by a cover 40 to be force fitted and provided with an annular seal 41.

From the cover 40 there extends a partition 42 which serves to prevent spinning of the emulsion with too high a dispensing velocity and promote blending together of the steam, milk, and air particles.

The dimensional ratios between the several conduits are selected to provide full condensation of the steam as it is admixed to milk and air, while ensuring adequate heating of the milk.

Furthermore, the ability to change the pins inserted into the conduits, or the use of the pin to control the working cross-sectional areas for the milk and air flows, affords for the user the faculty to adjust as desired both the milk and air flows to meet contingent requirements.

It should be also noted that to facilitate flushing the device clean, it would be possible to connect, to the air intake conduit, a flushing water supply conduit having a bypassable air-admitting hole, such that flushing can be carried out without the need for complex operations.

With reference to FIGS. 6,7,8,9 and 10, the emulsifier unit particularly for emulsifying steam and milk to prepare cappuccino's and the like beverages, comprises a nozzle body, comprehensively designated 101, which is associable with a steam delivery conduit extending from a steam generator consisting, for example, of the small boiler of a coffee making machine; the spray nozzle assembly 101 can be coupled to a dispenser body indicated generally at 102.

The spray nozzle body 101 has a substantially cylindrical configuration and defines on its interior a cavity 110 formed with an inside thread for coupling to a boiler steam delivery conduit; that conduit is led to a steam supply channel 111 which opens into a condensation channel 112 having an enlarged cross-sectional area. The condensation channel 112 opens, in turn, into a mixing channel 113 having a larger cross-sectional area than the condensation channel 112.

The spray nozzle body 101 has, on its lateral surface, two annular seals 114 set apart from each other to afford a tight coupling of the nozzle body 101 to the interior of a cylindrical cavity 120 defined in the dispenser body 102, which is practically fitted over the cited nozzle body 101.

The nozzle body 101 has, in the proximity of its forward end, a tapering termination 115 having an annular end seal 116 which fits in narrowing connection portion 121 defined on the continuation of the cavity 120 and being connected thereto by a frusto-conical taper 122.

More in detail, the nozzle body 101 has, at a region extending between the two cited annular seals 114, radial intake holes, indicated at 130, which open to a groove 131 which defines, in cooperation with the walls of the cavity 120, a suction chamber 140 in communication with an intake conduit 141 for the liquid to be emulsified which comprises, advantageously, milk.

The cited terminating body 115 is connected to the nozzle body 101 through an annular recess 150 which defines an abutment shoulder 151 which engages with the frusto-conical taper 122 and serves in practice as a retainer element for coupling the dispenser body 102 to the nozzle body 101. Provided at that annular recess 150 in the nozzle body 101, are radial holes 155 which communicate with an air suction chamber defined between the cited annular recess and the walls of the narrowing connection portion 121, which is formed with a hole 156 constituting an external air intake conduit.

The connection portion 121 opens into an emulsifying chamber, indicated at 160 and having a substantially cylindrical configuration, whereinto the steam is admitted in a near-emulsified state with the milk, to create a turbulent flow region which furthers the emulsification and condensation.

Advantageously, the milk and steam mixture is admitted along a tangent direction so as to promote blending.

Provided at the bottom of the mixing chamber 160 is an outward dispensing opening, indicated at 161.

With the foregoing arrangement, the steam jet which is directed into the steam delivery channel 111 on reaching the condensation channel 112 creates a Venturi tube effect which results in the milk being taken up through the intake conduit 141.

The milk drawn in is admixed to the steam which is condensing for the expansion phase, and in addition to promoting the steam condensation, receives the steam kinetic energy to assume the required amount of heat to bring it nearly to boiling.

The dimensional ratios between the several conduits are selected to accomplish a nearly thorough condensation of the steam on its becoming blended with the milk, while adequately heating the milk. Further, the provision of the external air intake conduit promotes incorporation of air particles to the mass which afford formation of a rich and uniform light cream in the emulsion which is specially appreciated by the user.

Moreover, by implementing the emulsifier unit with two mutually separable elements which can be coupled together in sealed relationship, greatly facilitates all the cleaning operations for removing milk residues apt to otherwise result in offensive odors and clogging.

It may by appreciated from the foregoing that the emulsifier unit according to the invention achieves the objects set forth, and in particular, it should be emphasized that its use is quite simple and requires no special skill of the operator, it affording the completion, in a near-automatic manner, of a thorough and perfect milk and air emulsion for cappuccino making.

I claim:

1. An emulsifier unit particularly for emulsifying steam and milk to prepare cappuccino and the like, comprising an emulsifying chamber having an outward dispensing opening, nozzle means defining a steam delivery channel and terminating in a nozzle positioned spaced from said chamber to define a suction chamber, a milk intake conduit and an external air intake conduit communicating with said suction chamber which in turn communicates with said emulsifying chamber whereupon steam introduced into said steam delivery channel jets out of said nozzle creating a vacuum in said suction chamber drawing milk and air into same to mix and emulsify in said emulsifying chamber and to be discharged therefrom.

2. An emulsifier unit, according to claim 1, wherein said nozzle means is sealingly received in a sleeve.

3. An emulsifier unit, according to claim 1, wherein said milk intake conduit and said external air intake conduit are aligned to each other.

4. An emulsifier unit, according to claim 3, wherein said milk intake conduit and said external air intake conduit extend substantially perpendicularly to the axis of said nozzle means.

5. An emulsifier unit, according to claim 4, wherein a pin is inserted into said milk intake conduit and said external air intake conduit for adjusting the working cross-sectional area for the milk and external air flows, respectively.

6. An emulsifier unit, according to claim 5, wherein said emulsifying chamber is sealed by a cover provided with a partition extending into said emulsifying chamber.

7. An emulsifier unit particularly for emulsifying steam and milk to prepare cappuccino and the like, comprising first means defining a steam delivery channel for communication with a steam generator, second means defining a condensing channel communicating with said first means, a milk intake conduit communicating with said second means, third means defining a mixing channel in communication with said second means, an external air intake conduit communicating with said third means, and an emulsifying chamber having an outward dispensing opening communicating with said third means.

8. An emulsifier unit, according to claim 7, wherein said first, second and third means are constituted by a nozzle body.

9. An emulsifier unit, according to claim 8, wherein said nozzle body has a substantially cylindrical configuration with an annular groove at a middle portion thereof delimited axially by a pair of annular seals, said annular groove defining, in cooperation with a cylindrical sleeve, a suction chamber.

10. An emulsifier unit according to claim 1, wherein said suction chamber communicates with said emulsifying chamber to introduce milk, air and steam tangentially therein.

* * * * *

REEXAMINATION CERTIFICATE (2304th)

United States Patent [19]
Paoletti

[11] B1 4,715,274
[45] Certificate Issued  May 24, 1994

[54] EMULSIFIER UNIT PARTICULARLY FOR EMULSIFYING STEAM AND MILK TO PREPARE CAPPUCCINOS AND THE LIKE BEVERAGES

[75] Inventor: Luciano Paoletti, Florence, Italy

[73] Assignee: SPIDEM S.r.l., Pero Frazione Cerchiate, Italy

Reexamination Request:
No. 90/003,220, Oct. 15, 1993

Reexamination Certificate for:
Patent No.: 4,715,274
Issued: Dec. 29, 1987
Appl. No.: 824,853
Filed: Jan. 31, 1986

[30] Foreign Application Priority Data

Jan. 31, 1985 [IT] Italy ................... 19311 A/85
Sep. 6, 1985 [IT] Italy ...................... 22947/85

[51] Int. Cl.⁵ ........................................ B01F 3/00
[52] U.S. Cl. ............................... 99/454; 99/275; 99/323.1; 99/452; 239/113; 239/427.3; 261/DIG. 7; 366/101; 366/139; 366/176; 366/341

[58] Field of Search ............ 99/452, 454, 275, 323.1; 239/428, 428.5, 427.5; 261/76, 116, DIG. 22, DIG. 26

[56] References Cited

U.S. PATENT DOCUMENTS

| | | |
|---|---|---|
| 2,146,605 | 2/1939 | Timpson . |
| 2,571,871 | 10/1951 | Hayes . |
| 2,724,583 | 11/1955 | Targos et al. . |
| 2,899,971 | 8/1959 | Munter . |
| 2,993,683 | 7/1961 | Mills . |
| 3,117,629 | 1/1964 | Rotvand . |
| 3,727,640 | 4/1973 | Sargeant . |
| 4,103,827 | 8/1978 | Kumazawa . |
| 4,219,134 | 8/1980 | Wiesner . |

FOREIGN PATENT DOCUMENTS

| | | |
|---|---|---|
| 409494 | 5/1934 | United Kingdom . |
| 1062263 | 3/1967 | United Kingdom . |

*Primary Examiner*—Timothy F. Simone

[57] ABSTRACT

An emulsifier unit particularly for emulsifying steam and milk to prepare "cappuccino's" comprises a steam delivery conduit in communication with a steam generator and opening into a suction chamber into which a milk delivery conduit is led, said suction chamber being in communication with an emulsifying chamber provided with an outward dispensing opening.

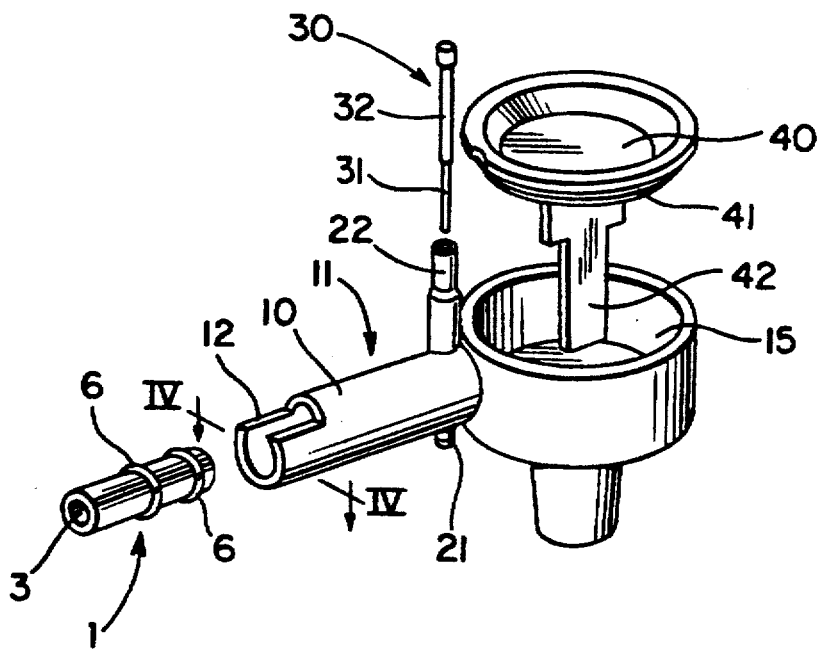

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-10 is confirmed.

* * * * *